(12) United States Patent
Fridman et al.

(10) Patent No.: US 12,467,788 B2
(45) Date of Patent: Nov. 11, 2025

(54) OPTICAL SPECTROMETER SYSTEM

(71) Applicant: BAR ILAN UNIVERSITY, Ramat Gan (IL)

(72) Inventors: Moti Fridman, Givat Shmuel (IL); Avi Klein, Oranit (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 213 days.

(21) Appl. No.: 18/258,962

(22) PCT Filed: Dec. 21, 2021

(86) PCT No.: PCT/IL2021/051518
§ 371 (c)(1),
(2) Date: Jun. 22, 2023

(87) PCT Pub. No.: WO2022/137234
PCT Pub. Date: Jun. 30, 2022

(65) Prior Publication Data
US 2024/0044705 A1   Feb. 8, 2024

Related U.S. Application Data

(60) Provisional application No. 63/130,428, filed on Dec. 24, 2020.

(51) Int. Cl.
*G01J 3/28*    (2006.01)
*G01J 3/02*    (2006.01)
*G01J 3/18*    (2006.01)

(52) U.S. Cl.
CPC .............. *G01J 3/28* (2013.01); *G01J 3/0218* (2013.01); *G01J 3/1895* (2013.01)

(58) Field of Classification Search
CPC .......... G01J 3/28; G01J 3/0218; G01J 3/1895; G01J 3/453; G01J 11/00; G02B 6/2861
See application file for complete search history.

(56) References Cited

U.S. PATENT DOCUMENTS 4,164,373 A * 8/1979 Schuss .................. G01J 3/2889
                                                   250/227.12
4,166,212 A * 8/1979 Judeinstein .......... G02B 6/2861
                                                   398/79

(Continued)

FOREIGN PATENT DOCUMENTS

CN          107490434         12/2017

OTHER PUBLICATIONS

Wan et al., High-resolution wavemeter using Rayleigh speckle obtained by optical time domain reflectometry, Optic letters, vol. 45, No. 4, Feb. 15, 2020, pp. 700-802.

(Continued)

*Primary Examiner* — Abdullahi Nur
(74) *Attorney, Agent, or Firm* — FisherBroyles, LLP; Roger L. Browdy; James E. Mrose

(57) ABSTRACT

A spectrometer system is described. The system comprises a signal input port and a pump input port, respective signal and pump dispersion fibers, a nonlinear optical fiber section, and an output dispersion fiber. The dispersion fibers are configured to apply predetermined spectral dispersion on light input associated with signal and pump inputs. The nonlinear optical fiber section is configured to receive dispersed signal and pump waves and enable nonlinear interaction between the signal and pump waves. The output dispersion fiber is configured to receive light resulting from said nonlinear interaction and apply predetermined dispersion to the received light, thereby providing output light having mapping between time and spectral components of the input signal. Wherein at least one of the signal input port and pump input port comprises temporal speckle generating unit configured to affect optical pulses passing through to induce temporal speckles within said optical pulses.

18 Claims, 8 Drawing Sheets

(56) References Cited

U.S. PATENT DOCUMENTS

| | | | | |
|---|---|---|---|---|
| 4,750,802 | A * | 6/1988 | Bhagavatula | H04B 10/25133 385/127 |
| 4,768,853 | A * | 9/1988 | Bhagavatula | H04B 10/25133 385/124 |
| 5,278,687 | A * | 1/1994 | Jannson | G01J 3/44 398/79 |
| 5,473,719 | A * | 12/1995 | Stone | H04B 10/25133 385/27 |
| 5,978,528 | A * | 11/1999 | Fidric | G02B 6/2861 385/24 |
| 6,396,607 | B1 * | 5/2002 | Cao | H04B 10/299 398/154 |
| 9,291,509 | B2 | 3/2016 | Lipson et al. | |
| 2012/0093519 | A1 | 4/2012 | Lipson et al. | |
| 2019/0316964 | A1 * | 10/2019 | März | G01J 3/36 |

OTHER PUBLICATIONS

Mahjoubfar et al., Time stretch and its applications, Nature photonics, vol. 11, Jun. 1, 2017, pp. 341-351.

* cited by examiner

OPTICAL SPECTROMETER SYSTEM

TECHNOLOGICAL FIELD

The present invention is in the field of inspection of optical signals and specifically relates to system and techniques for determining frequency components of optical signals.

BACKGROUND

Characterizing fast optical pulses is a known challenge in various fields such as optical communication, laser systems design and general research. Generally, determining spectral components of an optical signal provides valuable information on the signal.

Determining the spectral content of continuous wave or slow varying signal may utilize prism or any other known spectrometer. However, high speed communication and various other technologies using short pulses requires corresponding high-speed spectrometric analysis.

Various techniques are known for spectrally characterizing short pulses. However, these techniques are often limited by the sampling speed of photodiodes or other sensors used for detecting the spectral components variation through out the pulse duration. Some known techniques utilize autocorrelation or cross correlation of optical signals enabling to reconstruct short signal from its components. Such techniques include for example Frequency Resolved Optical Gating (FROG) and Spectral Phase Interferometry for Direct Electric-field Reconstruction (SPIDER).

U.S. Pat. No. 9,291,509 describes systems and methods for ultrafast optical waveform sampling based on temporal stretching of an input signal waveform. Temporal stretching is performed using a time lens based on four-wave mixing in a nonlinear medium. The signal is passed through an input dispersive element. The dispersed signal is sent into the time lens, which comprises a chirped pump pulse and a nonlinear medium. The chirped pump pulse is combined with the signal. The four-wave mixing process occurs in the nonlinear device or medium, which results in the generation of a signal at a new optical frequency (idler). The idler is spectrally separated from the signal and pump pulse using a bandpass filter and sent into an output dispersive element. The output dispersive element is longer than the input dispersive element and the temporal stretching factor is given by the ratio between the dispersions of these two elements.

GENERAL DESCRIPTION

There is a need in the art for a system or technique enabling to determine spectral content of optical pulses and characterizing the pulse. The present invention utilizes time-lens configuration enabling stretching a received optical pulse effectively magnifying the pulse structure in time to allow collection of its spectral content. The present technique may further utilize signal interaction with one or more temporal speckle fields, thereby enabling increased temporal resolution in signal characterization.

As indicated, the present technique utilizes a time-lens system. In parallel to imaging lens, a time lens system can be used to apply temporal magnification, or stretching, of a signal. Further, using properly selected parameters, a time lens system enables to provide Fourier transform of optical signal in time, thereby allowing to obtain spectral content of the signal.

In this connection, the term time-lens is used herein relates generally to an optical system configured for receiving optical signals and applying temporal manipulation substantially similar to the optical manipulation applied on spatial light distribution by an optical lens. More specifically, a time-lens unit is based on the equivalent between diffraction of light in space and dispersion of pulses in time. Similar to a spatial lens a time-lens affect phase of optical pulses with a generally quadratic shift, differently from spatial lens, time lenses apply quadratic phase shift in time on an input signal. The time lens used in the present technique is generally described using four-wave mixing interaction with a pump signal. However, the present technique may be operated using various other time-lens configurations and should not be limited to this specific configuration.

As indicated herein, the present technique utilizes a time lens optical configuration, adapted to receive input optical signal (e.g., one or more pulses). The time lens configuration applies a selected phase that effectively stretches the input signal in time and can provide output signal indicative of spectral composition of the input signal. In general, the output signal includes frequency-to-time mapping of the input signals, in the meaning that intensity of different temporal instances of the output signal corresponds to coefficient of different spectral components in the input signal.

In this connection, a typical time-lens configuration generally does not retain phase, polarization and/or spatial mode information of the input signal. To this end, the present technique provides an optical pulse characterizing system configured for separately and independently provide spectral information of different modes of input pulse. More specifically, the present technique utilizes input of multimode optical signal into a multimode optical fiber that directs the signal to a mode separating unit. The mode separating unit is adapted to separate a selected number of spatial modes of the input light toward a corresponding selected number of different optical fibers. Thus, each of the different optical fibers receives a single mode optical signal associated with a respective spatial mode of the input signal. The respective optical fibers are configured to induce predetermined delays between signal of the respective spatial modes and combine at input port of the time-lens unit. This converts the input multimode signal into a train of selected number of single mode signals, where each signal corresponds with a respective spatial mode component of the multimode signal. The time-lens unit is generally used to provide data on spectral components of each signal portion, thereby enabling to separately obtain data on spectral components of different spatial modes of multimode optical signal.

The present technique may also be used for obtaining data on spectral components of different polarizations of an input signal. This may be provided by separating input pulse into different polarization components, generating a time delay between the polarization components and recombining the different polarization components at an input port to the time lens unit.

Further, it should be noted that obtaining spectral components of optical signal using a time-lens configuration may generally be considered as temporal equivalent to plane wave illumination. The temporal resolution may be as high as that of a detector (e.g., photodiode) positioned at output port of the time-lens unit. The present technique may further utilize speckle field for enabling super-resolution detection of spectral components. More specifically, the present technique may induce speckle fields on input signal and/or on pumping signal (as described further below). The speckle field may be varied between repeating measurements allowing to obtain improved resolution and spectral separation of the input signal components.

Thus, according to a broad aspect, the present invention provides a system comprising input port providing input to a multimode optical fiber, the input port being configured for receiving input optical signal, a mode temporal separating unit configured to apply selected time delay between signal components of a selected number of different spatial modes in the input optical signal, an optical spectrometer unit configured for providing high resolution spectroscopic data of the different spatial modes.

According to some embodiments, the optical spectrometer unit may comprise a time-lens optical spectrometer.

According to some embodiments, the system may further comprise a pump signal input module configured for to receive input pomp signal and generate a pulse train having a selected number of pump replications, said optical spectrometer unit utilizes nonlinear interaction between signal and pump waves.

According to some embodiments, the optical spectrometer unit may comprise a first signal dispersion fiber and second pump dispersion fiber configured for providing selected chirp level to signal and pump inputs, nonlinear fiber section configured to enable nonlinear interaction between chirped pump and signal waves providing interaction wave, and dispersion fiber configured to apply selected chirp level to the interaction wave, thereby providing output signal indicative of spectral components of the input signal.

According to some embodiments, the system may further comprise a temporal speckle generating unit positioned to apply a temporal speckle field onto input optical signal.

According to some embodiments, the temporal speckle generating unit may comprise random long period fiber grating.

According to some embodiments, the random long period fiber grating may be positioned under temperature or stress variation.

According to one other broad aspect, the present invention provides a spectrometer system comprising a signal input port and a pump input port, respective signal and pump dispersion fibers configured to apply predetermined spectral dispersion on light input associated with signal and pump inputs, a nonlinear optical fiber section configured to receive dispersed signal and pump wave and enable nonlinear interaction between the signal and pump waves, and an output dispersion fiber configured to receive light resulting from said nonlinear interaction and apply predetermined dispersion to said light, thereby providing output light having mapping between time and spectral components of the input signal; wherein at least one of the signal input port and pump input port comprises temporal speckle generating unit configured to affect optical pulses passing through to induce temporal speckles within said optical pulses.

According to some embodiments, the temporal speckle generating unit may be configured for temporally shifting the speckle pattern between repeating measurements, to thereby enable spectral measurement with improved resolution.

According to some embodiments, the temporal speckle generating unit may comprise a random long period fiber grating (RLPFG).

According to some embodiments, the RLPFG may be positioned along said signal input port, said RLPFG is placed under temperature or stress variation to thereby shift said temporal speckles in input optical signals.

According to some embodiments, the RLPFG may be positioned along said signal input port, said signal input port further comprising a wavelength tunable filter configured for selectively shifting wavelength filtering of input signals and a free-space encoding unit configured to provide shifting of temporal speckles with respect to input signal pulse.

According to some embodiments, the RLPFG may be positioned along said pump input port, said pump input port further comprises a delay line configured for selectively temporally shifting speckles with respect to one or more input pulses provided though the signal input port.

According to some embodiments, the temporal speckle generating unit may comprise a pulse shaper unit comprising at least one grating and spatial light modulator, said at least one grating is positioned to receive input pulse and spectrally separate components of said pulse and direct the pulse components toward said spatial light modulator, said spatial light modulator is configured to apply selected (generally pseudo random) spatial pattern on the light components.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 6A shows speckle fields generated for different pulse lengths, FIG. 6B shows variations in speckle field due to environmental variations;

FIG. 7A illustrates a multimode spectrometer, FIG. 7B illustrates a multimode spectrometer using speckle based super resolution, and FIG. 7C illustrates a polarization spectrometer using speckle super resolution.

DETAILED DESCRIPTION

Figure 1:
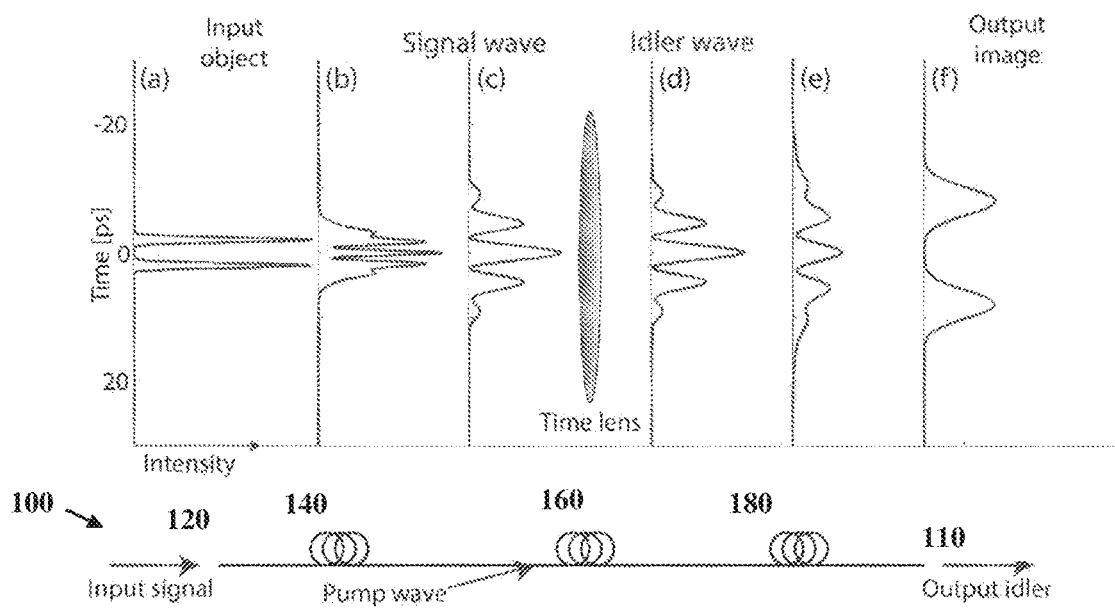
FIG. 1 schematically illustrates a time-lens unit and its operation on an input pulse.

Reference is made to FIG. 1 illustrating general configuration and operation of a time-lens unit 100. FIG. 1 includes a schematic illustration of the time-lens unit 100 and an illustration of signal evolution through the time-lens unit in parallel to spatial imaging lens. As shown, the time-lens unit includes an input port 120, configured for receiving input optical signal, a dispersive element 140, such as dispersive optical fiber of a predetermined length, optical interaction element 160, output dispersive element 180, typically configured to reverse dispersion affected by dispersive element 140, and output port 110 configure to provide output idler being output signal of the time-lens unit 100.

Generally, a time-lens unit 100 may be considered as a temporal stretching device. The input dispersive element 140 may be an optical fiber having selected dispersion and length for dispersing an input signal waveform over a signal path and produce a dispersed input signal waveform such as signal wave (c). As indicated, the time lens-unit 100 is configured to receive one or more pump pulses. To this end the time-lens unit 100 may include a pump pulse source or a pump input port (not specifically shown here). The one or more pump pulses are dispersed in generally similar dispersion level as that provided by dispersive element 140 or transmitted though pump dispersive element having similar dispersion and length. Thus, the one or more pump pulses undergo dispersion over a pump path to produce a dispersed pump signal. Thus, the time-lens unit utilizes selected chirp level of the input signal and corresponding chirp level of the pump signal. The dispersed (chirped) input signal and dispersed pump signal interact within the interaction element 160 to provide interaction wave. For example, the time-lens unit 100 may include an optical coupler positioned to combine dispersed pump signal and the dispersed input signal, directing the dispersed signals into the interaction element 160. Generally, interaction element 160 may be a nonlinear optical fiber section, selected to provide nonlinear interaction between the dispersed input signal and dispersed pump signal. such nonlinear interaction may be four-wave mixing, three wave mixing, modulation using an electro-optical modulator or other nonlinear interaction. The interaction element 160 may be configured to generate an interaction signal that may be characterized by frequency range that is generally different from that of the dispersed input signal and that of the dispersed pump signal, to allow filtering out the dispersed input and pump signals from the interaction signal, e.g. by band pass filter. The interaction signal is passed through the output dispersive element 180 providing the output idler signal 110. As indicated above, the output dispersive element 180 is typically selected to provide reverse dispersion (reverse chirp) with respect to that of the dispersive element 140, providing that the output signal, associated with output image (f) is indicative of temporal Fourier transform of the input signal, input object (a). More specifically, for suitable dispersion parameters the output signal is indicative of spectral composition of the input signal. Thus, the time-lens unit 100 can be used to provide spectrometric data of the input signal. Resolution of the spectrometric data may be determined by dispersion level applied by the dispersive elements 140 and 180, and temporal response of a detector used for detection of the output signal.

Generally, the input signal and the pump signal are synchronized, in order to provide overlap of the input and pump signals and provide efficient interaction between them. As indicated above, the pump signal is typically dispersed to a level being twice the chirp level of the input signal. This results in the input signal and the pump signal being chirped (or reversed chirped) at the interaction element 160 where different frequency components interact between them. The nonlinear interaction results in output idler 110 carrying quadratic phase shift with respect to the input signal.

Figure 2:
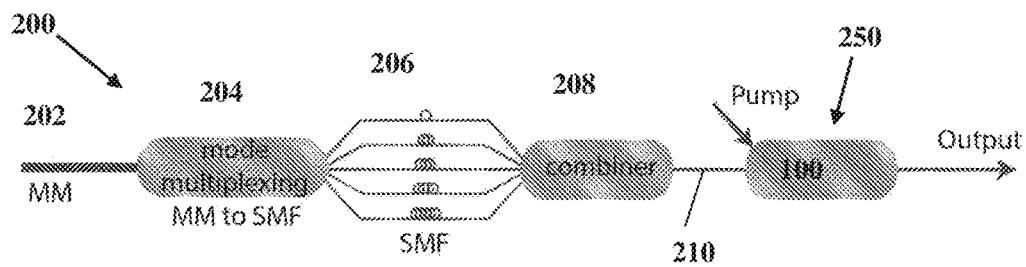
FIG. 2 illustrates a multimode time-lens spectrometer according to some embodiments of the invention.

The time-lens unit 100 represented in FIG. 1 provide efficient spectrometric data for single mode input signals. However, optical signals traveling in multimode fibers may present complex and unique dynamics that impose various difficulties in characterizing such signals. More specifically, when high power signals travel in multimode fibers, signal components of different spatial modes may interact between them resulting in mixing between the modes. This mode mixing limits the ability to characterize multimode dynamics and properties of shot pulse signals travelling in such multimode fibers. The present technique further utilizes the efficient signal characterization enables by time-lens configuration, enabling to determine signal spectral composition for a selected number of different spatial modes of a signal transmitted through a multimode fiber. Reference is made to FIG. 2 illustrating general configuration of multimode spectrometer system 200 for determining spectral components of multimode signal according to some embodiments of the present invention. System 200 includes an input port 202 configured to receive input multimode optical signals into a multimode optical fiber, a mode multiplexing unit 204 configured to separate a selected number of spatial modes of the input multimode signal into a corresponding number of delay line optical fibers 206. Delay line optical fibers 206 are generally an arrangement of a selected number of single mode optical fiber having selected different lengths. Thus, the input signal is separated into a selected number N of signal portions in accordance with the different modes, where each signal portion is transmitted through a corresponding delay line to gain a corresponding time delay different than those of other signal portions. The selected number of delay line optical fibers 206 are combined in combiner 208 into a common single mode fiber 210. Generally, a selected number of spatial modes on the input signal is transferred into a train of single mode pulses separated between them by a predetermined time. The train of input signal portions is provided into a pulse spectrometer unit 250 configured to provide spectral data on the input signals. The spectrometer unit 250 may be configures as a time-lens unit 100 as exemplified in FIG. 1. In this configuration, the time-lens unit 100 may generally utilize a respective train of pump signals in accordance with the train of input signals. This configuration provides spectral analysis of the different spatial components of the input signal and allows for characterizing multimode input signal.

The mode multiplexing unit 204 is configured to receive input multimode signal and provide output of a selected number of single mode signals, each corresponding with components associated with a spatial mode of the multimode signal. The mode multiplexing unit 204 may for example be a LPMUX series mode multiplexer, such as LPMUX6. Thus, an input signal composed of a plurality of, e.g., three, four, five or six, spatial modes is separated into corresponding number of single mode signal components such that each spatial mode of the multimode signal is transmitted into a corresponding one single mode fiber forming a set of delay line fibers 206.

The delay line fibers 206 represent a set of a selected number of optical fibers, having selected lengths to provide different temporal delays to pulses in the different lines. More specifically, given a multimode input signal, transmitted in a multimode input optical fiber 202 and separated into three different spatial modes using mode multiplexing unit 204. A first mode, e.g., LP01, is transmitted in first delay line having a selected length; second mode, e.g., LP11, is transmitted in a second delay line having a length that corresponds to 1 nanosecond delay time with respect to the first delay line; and third mode, e.g., LP02, is transmitted in third delay line having length corresponding with 2 nanosecond delay with respect to the first delay line. This configuration transformed a multimode input signal into three single mode signals having 1 nanosecond delay between them.

It should be noted that the number of delay lines may be 2 or more, i.e., 4, 5, 6 or any other number of delay lines selected based on the number of modes to be separated from the input signal. It should also be noted that the length difference of the delay lines may be selected based on pulse length and required separation of the different pulses. For example, a difference of 1 kilometer in the delay lines provides about 3.3 microseconds. Thus, a length difference between the delay lines may be selected as 100 m or 500 m, 1 kilometer or more in accordance with the delay time between the pulses and signal length.

The different delay lines 206 are combined into a common optical fiber by combiner 208. Combiner 208 may be a N to 1 optical fiber coupler, where N is the number of different delay lines, and the number of different spatial modes separated into the delay line 206. Combiner 208 may preferably be single mode coupler and may or may not preserve polarization of the signals.

The combiner 208 provides input signal through a single mode input port 210 to a spectrometer system 250. Spectrometer system 250 may generally be any spectrometer system configured for providing spectral data on input optical signals. In some preferred embodiments, spectrometer system 250 may be formed by a time-lens unit 100 as exemplified in FIG. 1. Typically, conventional time-lens spectrometer unit as exemplified herein in FIG. 1 provides high-speed and high-resolution spectral data of input pulses, given that the pulses are sufficiently separated. Moreover, the time-lens spectrometer unit 100 cannot by itself resolve data on spatial modes of the input signal. Multimode spectrometer system 200 provides multimode to single mode pulse train conversion enabling characterizing multimode input signals and their spectral content.

Figure 3:
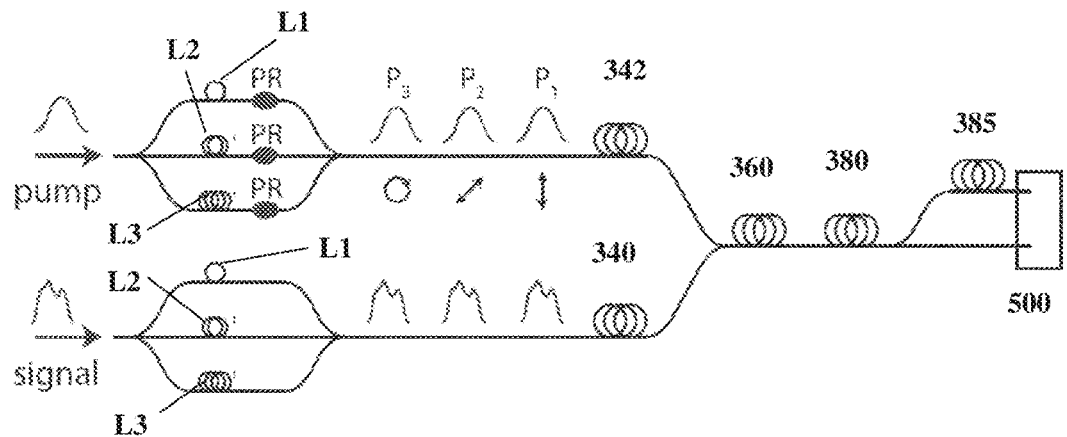
FIG. 3 illustrates a polarization resolving spectrometer according to some additional embodiments of the invention.

An additional spectrometer configuration is exemplified in FIG. 3 illustrating a polarization spectrometer unit 300. In this example, an input signal is separated into three delay lines having lengths L1, L2 and L3 respectively and recombined into a common fiber, providing pulse train of tree pulse copies with selected delay between them. At a second channel, input pump signal is separated into corresponding three delay lines having similar lengths L1, L2 and L3. Each of the pump delay lines also includes a polarization filter PR. It should however be noted that the polarization filters PR may be positioned along the respective input signal delay lines or along the pump delay lines. In this specific example, the polarization filters PR provide that first delay line transmits pump signal having linear vertical polarization, the second delay line transmits pump signal having linear horizontal polarization and the third delay line transmits pump signal having circular polarization. The input signal pulse train, and the pump pulse train are used as input into a time-lens spectrometer unit, where the pump pulse train is typically used as pump interacting with the input signal pulses. This configuration provides polarization resolved spectral data of the input signal. More specifically, the input signal pulse train is passed through dispersion fiber 340 to provide chirped pulse train, the pump pulse train is transmitted through a corresponding dispersion fiber 342 providing chirped pump pulse train. The chirped pump and signal pulse trains are interacted in a nonlinear fiber section 360 generating interaction wave. The interaction wave passing through output dispersion fiber 380 to provide output signal indicative of spectral components of the different polarization portions within the input signal. The spectral components of the output signal may be detected by detector 500 (e.g., scope, photodiode etc.). FIG. 3 also exemplifies a second output port, utilizing an additional reverse dispersion fiber 385. Generally, the additional output port may be used in any time-lens spectrometer configuration and may be used for retrieving phase data of the input signal. This may be performed using various phase retrieval algorithms, enabling to obtain the phase of the signal as a function of time.

Figure 4:
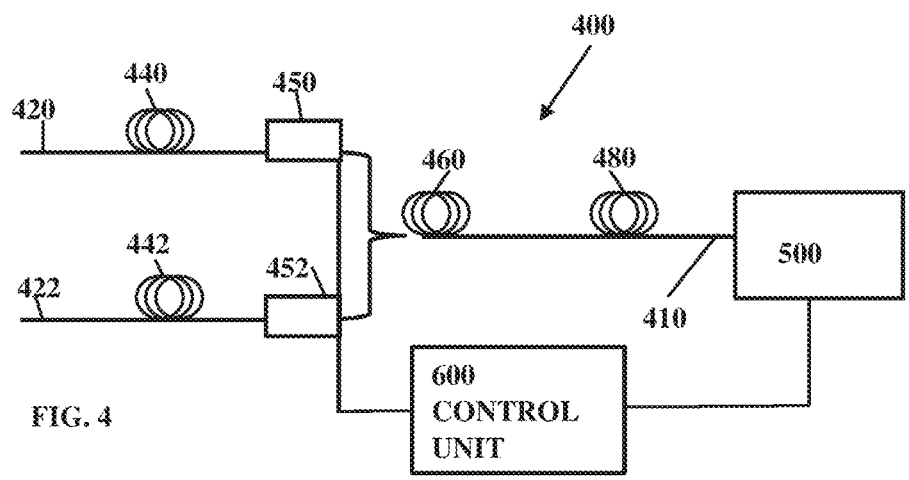
FIG. 4 illustrates a time-lens based spectrometer system using temporal speckle filed for super-resolution data according to some additional embodiments of the invention.

The present technique further provides for improving resolution of the optical spectrometer. To this end the present technique utilizes imposing speckle field onto at least one of input signal and pump pulse prior to feeding the respective pulses as input to the time-lens spectrometer unit. The present technique generally utilizes temporal speckle fields for enhancing temporal resolution in determining spectral data of input optical signals. Reference is made to FIG. 4 exemplifying an optical spectrometer unit 400 configured according to further some embodiments of the present technique. The optical spectrometer 400 includes signal input port 420 and pump input port 422, and respective signal and pump dispersion fibers 440 and 442, typically affecting similar chirp level to the signal and pump inputs. At least one of the signal and pump arms of the spectrometer, further includes a speckle generating unit, marked here by 450 or 452. The pump and signal arms combine to interact at a nonlinear fiber section 460 and propagate to an output dispersion fiber section 480. This provides output signal at the output port 410, which is detected by detector 500.

The spectrometer unit 400 may generally also include a control unit 600, e.g., configured as a computing unit including one or more processors, memory, and input/output interface. The control unit 600 is configured for receiving collected data from the detector 500, the collected data may be associated with speckle decoding mask as described further below, and/or collected spectral data obtained by the time-lens unit. The control unit may generally store the collected data in the memory thereof, for use as decoding mask, integrating/summing over a plurality of speckle fields and/or provide direct spectral measurement of a signal. The control unit may further utilize the processor for processing the collected/measured data on a signal, with respect to prestored (or collected) speckle decoding mask data, for determining super-resolution spectral data of an input signal.

The spectrometer 400 may be operated for collecting spectral data on a plurality of two or more replications of an input signal, using different speckle fields to enable improved resolution of spectral data. More specifically, the input signal is measured several times with different speckle fields, and the collected spectral data is summed to obtain spectral data of the signal with improved temporal/spectral resolution.

Generally, speckles result from randomized phase distribution across an electric field, e.g., electromagnetic signal. Illumination of spatial speckle field on object imposes high frequencies, which can be used for imaging with improved resolution. The present technique utilizes temporal speckle fields for enhancing resolution of temporal/spectral signal. A temporal speckle field can be described as a signal with a varying phase distribution. i.e., the phase distribution varies as a function of time, while not necessarily maintaining smooth variation. Such temporal speckle field typically includes various signal frequencies, being affected by dispersion, e.g., by dispersion fiber 440 or 442, to propagate at different velocity. The temporal speckle field may be generated for example by a random fiber grating, e.g., random long period fiber grating (LPFG), generating various amplitudes and phase shifts between signal portions and further affected by the dispersion fiber.

The present technique utilizes imposing temporal speckle field to obtain super-resolution spectrometry based on the following: the temporal speckle field $s(\tau)$, may be measured to obtain a decoding mask $s'(\tau)$, and applied on the signal or on the pump pulses. The spectrometric data of the signal is collected for several signal replications with shifts or changes in the speckle field providing $$o_{\Delta t}(t) = \int [g(\tau)s(\tau-\Delta t)]h(t-\tau)d\tau, \quad (1)$$

where $g(\tau)$ is the input signal, $\Delta t$ is the shift of the speckle field, $o_{\Delta t}(t)$ is the obtained spectral data for signal measurement, and $h(t)$ is the impulse response function of the time-lens unit. Typically, the impulse response function imposes a low-pass filter to spectral sensitivity of the spectrometer unit, in analogy to finite aperture in spatial lens.

Applying the decoding mask, and determining the spectrometric data for a plurality of speckle fields, i.e., a plurality of images with shifted speckle fields, provides:

$$o(t) = \int o_{\Delta t}(t)s'(t-\Delta t)d\Delta t = \iint \{[g(\tau)s(\tau-\Delta t)]h(t-\tau)\}s'(t-\Delta t)d\tau d\Delta t \quad (2)$$

This may be simplified by rearranging the integral order, under the assumption that the speckle field is random, so the autocorrelation of the speckle field is a delta function, provides:

$$o(t) = \int g(\tau)h'(t-\tau)d\tau = g(x) \otimes h'(x) \approx g(t) \quad (3)$$

The operator $\otimes$ is the convolution operator. In this representation, the output $o(t)$ is equal to a high-resolution image of the input, while eliminating the low-pass filter associated with the time-lens aperture. Therefore, obtaining higher temporal resolution than possible with the time-lens having given configuration with respect to chirp level and length of the optical fibers.

Accordingly, the control unit 600 may operate the speckle generating unit 450 or 452 for selective varying the speckle filed and provide respective measured data for signal replications imposed by the different speckle fields. The control unit 600 may thus utilize the collected spectral data and respective speckle decoding masks for determining super-resolved spectral data of the signal, and provide output to an operator, or store/transmit for further use.

As indicated above, the speckle field may be generated using a random LPFG. Accordingly, variation of the speckle field may be associated by temporal shift by $\Delta t$, wavelength shift of the signal or pump pulses, or general random or pseudo random variation of the speckle field (i.e., generating a new speckle field for each measurement). For example, according to some embodiments, the present technique may utilize variations of the speckle field by imposing changes to the LPFG parameters, typically continuously to thereby enable monitoring of the speckle field variations. It should be noted that in the above representation of equations 1 to 3, the parameter $\Delta t$ may thus be replaced with any other continuous or discrete parameter indicating variations in the speckle filed. Typically, the speckle fields may be measured separately from the signal to determine the corresponding decoding mask $s'(T)$.

Figure 5A:
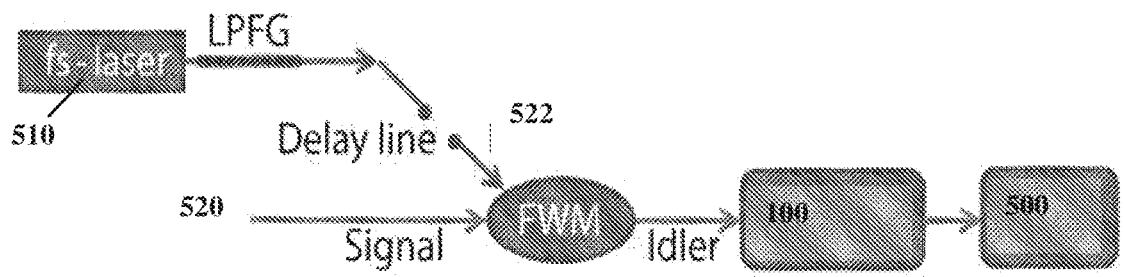
FIGS. 5A to 5C exemplify different schemes for providing temporal speckle field that can be continuously shifted according to some embodiments of the invention, FIG. 5A exemplifies temporal shifts, FIG. 5B exemplifies wavelength shifts, and FIG. 5C exemplifies shifts associated with environmental variations.
Figure 5B:
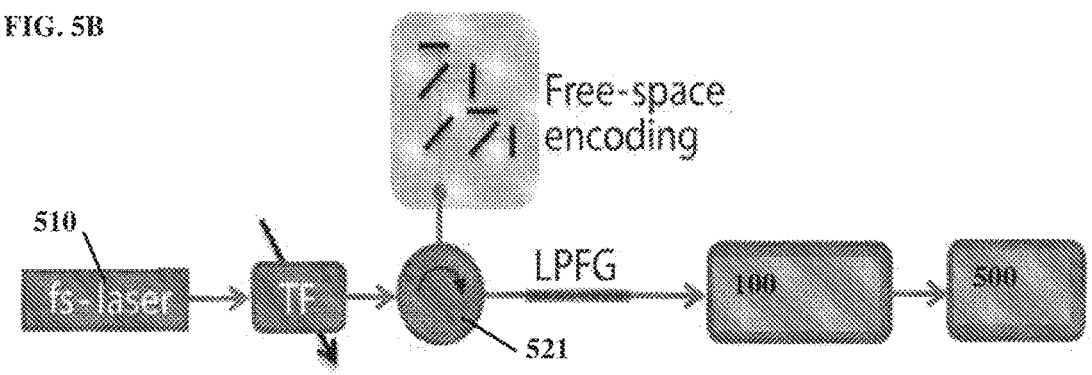
Figure 5C:
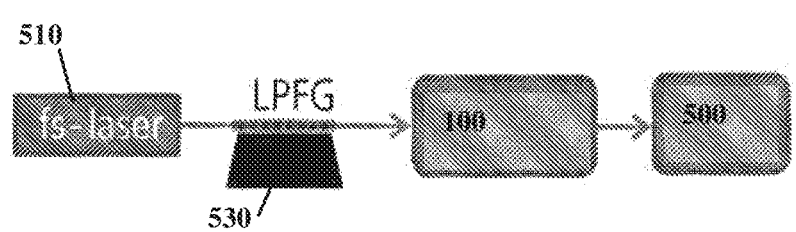

Reference is made to FIGS. 5A to 5C exemplifying optical configurations allowing generation of temporal speckle fields and controlled variations of the speckle field in a generally continuous manner. FIGS. 5A to 5C focus specifically on the speckle filed generating unit, marked as 450 or 452 in FIG. 4, and providing at least one of signal and pump inputs to the time-lens based spectrometer system. FIG. 5A shows a fast laser 510 providing output pulses directed toward a random or pseudo random long period fiber grating LPFG, the signal is transmitted through a variable delay line 522 enabling selectable shifts of the speckle field with respect to the signal pulses. The signal 520 is interacted with output of the random LPFG by four wave mixing providing speckle-field imposed signal, marked as idler, for use as input to the time-lens unit 100. FIG. 5B illustrates a speckle generating unit using wavelength shifting provides by a tunable filter TF. This input pulse is transmitted through the tunable filter TF, which varied the transmitted wavelength range by $\Delta\omega$ between repeated measurements and transmitted to a free space encoding path using a circulator 521, the encoded filtered signal is transmitted through the LPFG imposing speckle field on the signal and is provided as input to the time-lens unit 100. The example of FIG. 5C utilizes random (or pseudo random) LPFG positioned on in controlled environment 530. the controlled environment may be a heating platform allowing selective variation in temperature, or selected clamps or pressure unit enabling selective variation in stress applied on the LPFG.

As indicated, the shifts in the speckle field may be applied directly on the time difference of the speckle filed as exemplified in FIG. 5A. Alternatively, the present technique may utilize shifting in the wavelength domain or shifting caused by applying selected temperature or stress variations on the LPFG. Further, to provide proper enhancement to resolution of the spectrometry measurement, the technique of the present invention may utilize a plurality of measurements (using detector 500) of signal spectrum data with varying speckle fields. Additionally, the spectrometer may operate for measuring output data formed in response of the speckle filed by itself, without imposing it on an input signal, to thereby determine the speckle decoding mask. The speckle decoding mask data may also be stored in a storage unit and obtained therefrom.

Thus, as discussed herein, the example of FIG. 5A utilizes time shifting of the speckle filed using a variable delay line and imposing the speckle onto the input signal by nonlinear interaction. The delay-line controls the timing of the speckle field shifting the speckle filed by $\Delta t$ directly. Generally, the use of nonlinear mixing of the speckle filed and input signal may reduce efficiency.

Alternatively, the example of FIG. 5B utilizes shifting the wavelength of the speckle field. In this technique, a tunable pass filter TF is used for selective, and generally continuously, vary wavelength of light input to the speckle generating unit. The signal itself, may be obtained in free-space optics of the input light. In some additional configurations, the speckle generating unit may be associated with pump input of the time-lens unit, and thus the free-space encoding section may be omitted.

In some preferred embodiments, exemplified in FIG. 5C, the speckle filed may be varied using variation of external environment applied on the LPFG. More specifically, the LPFG may be placed in a generally controlled temperature or stress conditions, where the temperature or stress may be selective varied between repeating measurements. This may be associated with heating/cooling platform 530 affecting temperature of the LPFG, piezoelectric module configured for applying selective stress variation on the LPFG etc. The environment variations effectively change periodicity of the LPFG, thus affecting the so-generated speckle filed. This configuration may be used in applying speckle filed onto the signal or pump inputs of the spectrometer unit of the present technique.

Figure 6A:
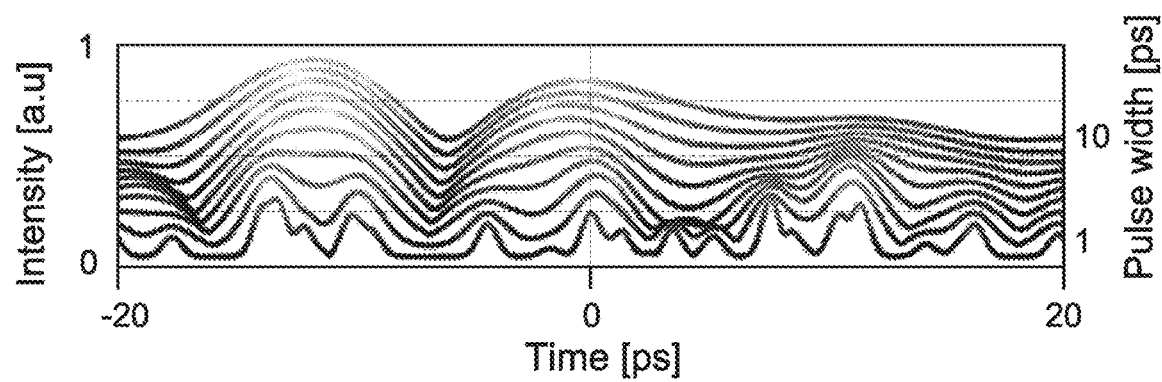
FIGS. 6A and 6B show measured data of speckle field.
Figure 6B:
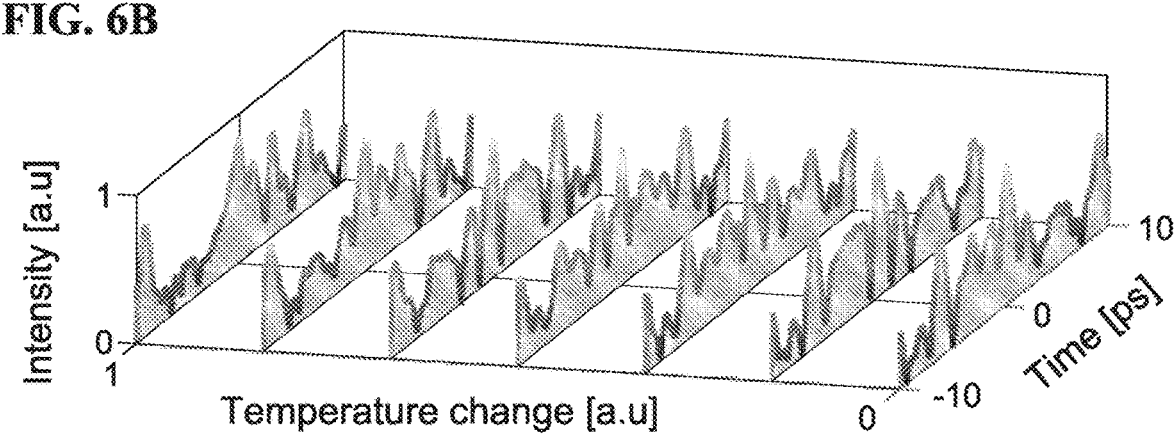

To enable improved resolution, the speckle field may preferably have features smaller with respect to the desired resolution. In this connection, the temporal speckle filed is preferably generated with speckles having frequencies being at least similar, and preferably greater than the desired maximal frequency in which the signal spectrum is to be resolved. Reference is made to FIGS. 6A and 6B showing simulation of pulse propagation through LPFG. FIG. 6A show output intensity as a function of time for different input pulse widths. FIG. 6B show speckle filed generated for different LPFG temperatures. As shown in FIG. 6A, size of features of the speckle field depends on width of the input pulse generating the speckle field. This simulation indicates that to obtain a speckle field having short features, the input pulse is preferably 1 picosecond or less. Further, input pulse having width of 100 femtosecond or less, may typically provide speckle field having sufficiently short features to enhance spectral resolution with respect to currently available photodiodes' response time.

The simulation of FIG. 6B show variation of the speckle filed in response to temperature variation of the LPFG, as exemplified in FIG. 5C. This indicates a substantially continuous variation of the speckle field in response to temperature shifts, enabling to use such variation within the context of equations 1 to 3 above for determining super resolution spectral content of input signals.

Figure 7A:
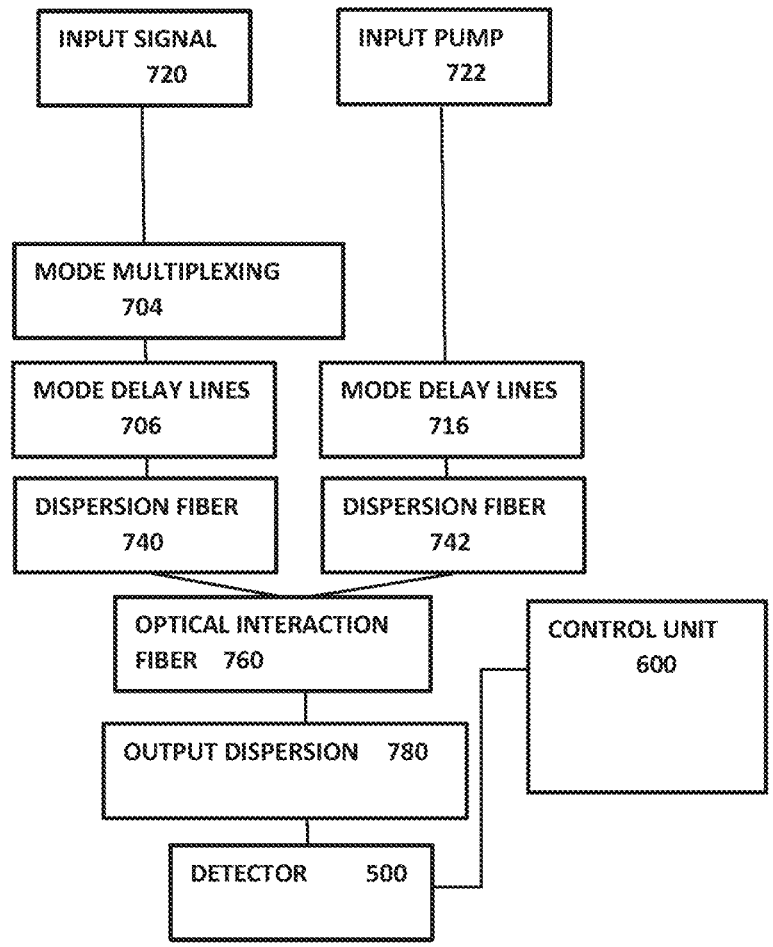
FIGS. 7A to 7C illustrate configurations of optical spectrometer systems according to some embodiment of the present invention.
Figure 7B:
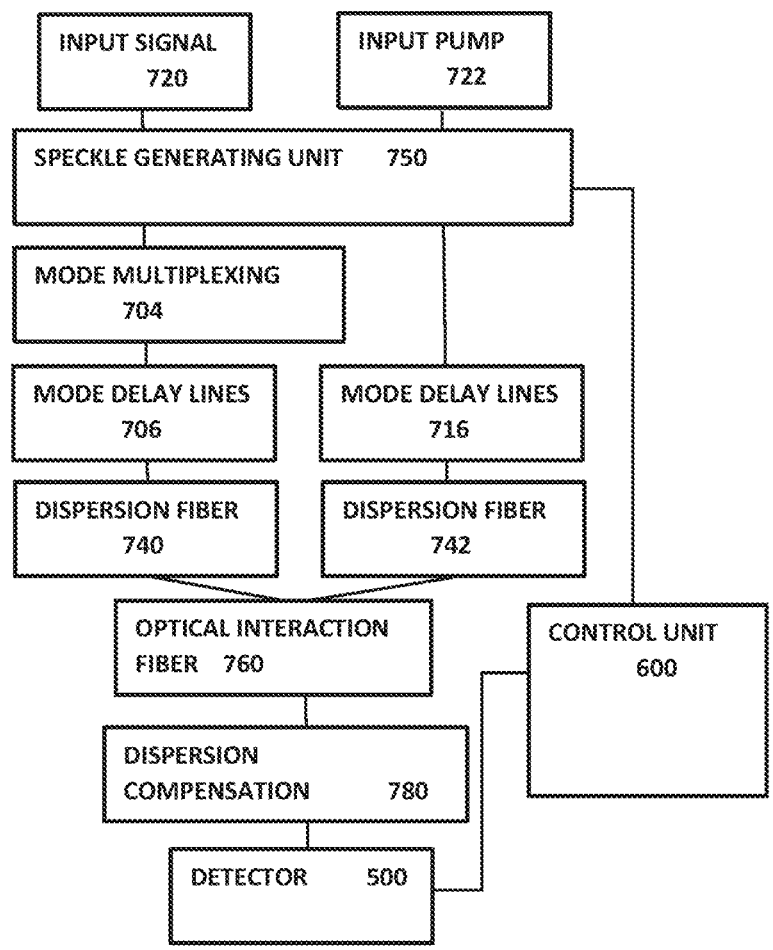
Figure 7C:
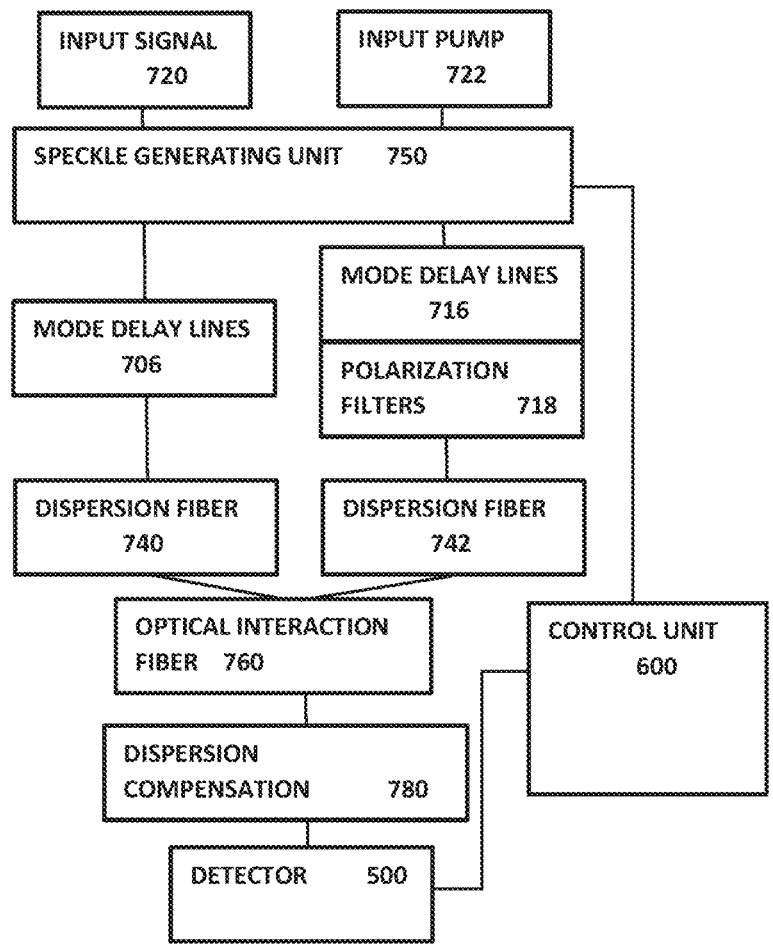

It should be noted that the above-described techniques may be implemented individually and separately, or in combination between them. More specifically, the present technique provides for spectrometer unit configured for detecting spectral data of multimode signals, different polarization components of a signal and may utilizes speckle field generating unit for enhancing resolution of the so-obtained spectral data. For example, reference is made to FIGS. 7A to 7C exemplifying general configurations of optical spectrometer systems according to yet some additional embodiments of the present invention. FIG. 7A illustrates a multimode signal spectrometer, FIG. 7B illustrates a multimode signal spectrometer using speckle filed for super resolution, and FIG. 7C illustrates a polarization resolving spectrometer system utilizing speckle field super resolution.

The spectrometer system of FIG. 7A includes input signal port 720 and input pump port 722. The input signal port 720 is generally an input port for a multimode optical fiber, accordingly, the input signal is directed at a mode multiplexing unit 704 separating the input multimode signal into a selected number of single mode signals, passing through corresponding number of mode delay lines 706. The pump signal is also transmitted through a corresponding arrangement of delay lines 716, having generally similar delays. The delay lines 706 and 716 include a selected number of delay lines having different delays between them configured to temporally separate pulse replications with predetermined delay between each pulse replication. The delay lines 706 and 716 may further combine the pulse replication into a common optical fiber to be measured along a common spectrometer system.

The pulse replications are generally directed into a time-lens spectrometer unit. More specifically, the input and pump signal are transmitted through dispersion fibers 740 and 742 to apply selected chirp on the pulses, and to interact in nonlinear fiber section 760. The interaction output is passed through output dispersion fiber 780 to provide selected spectral image of the input pulses, generally measured by detector 500. The collected spectral data may be transmitted to a control unit 600 for storage, processing, presentation, and/or transmitting to a further unit for additional processing or measurements.

Due to the different delays of the pulse replications, and the mode multiplexing provided by mode multiplexing unit 704, the output signals include a set of a predetermined number of output signals, each having a length (time duration) and each corresponds with one of the modes of the multimode input signal.

The example of FIG. 7B illustrates a spectrometer unit further configured to further utilize super-resolution techniques for obtaining enhanced resolution of the spectral data. In this configuration, at least one of the signal and pump inputs includes a speckle generating unit 750, configured to impose speckle field with selected parameters onto the respective signal or pump pulses. The speckle generating unit 750 is configured for imposing temporal speckle field onto the signal or pump pulses and enable variation of one or more parameters of the speckle filed. For example, the speckle field generating unit 750 may be configured as exemplified in any one of FIGS. 5A to 5C above. In this connection, the speckle generating unit may be configured to selective and controllably vary temporal shift of the speckle field with respect to the respective pulse, vary relative wavelength of the speckle filed and/or vary other speckle field parameters, e.g., associated with external environment of the speckle field generating unit as exemplified in FIGS. 5C and 6B. Additionally, the control unit 600 of the spectrometer system may include a memory unit and one or more processor, and is connectable to the speckle generating unit 750 to provide data indicative of variation of the one or more parameters of the speckle field. Accordingly, the control unit 600 may include operational instructions for operating the spectrometer system to repeatedly collected measured data of a plurality of input signals, while operate the speckle generating unit 750 to imposed slightly shifted speckle field on each of the input signals. The control unit 600 may also be connected to input pump light source and/or signal source to enable operation of the spectrometer system.

In some configurations, the control unit 600 may operate the system for transmitting speckle field imposed on a generally uniform optical signal, to thereby provide data indicative of speckle decoding mask. The control unit 600 may further store the data on speckle decoding mask in the memory thereof, or at a remote storage unit for later use. Generally, the control unit may operate for measuring an input signal, or a plurality of generally similar input signals, while operating the speckle generating unit 750 to impose shifts in the speckle field on each of the signals. As indicated, the shifts may be associated with temporal shifts, wavelength shifts and/or temperature or stress relates shifts. Thus, the control unit 600 may operate the spectrometer system for collecting spectral data of a plurality of replications of the input signal, each with imposed shifted speckle field, and utilizes the pre-stored data on the speckle decoding mask for determining accordingly improved resolution of the input signal spectral data.

An additional configuration is exemplified in FIG. 7C. In this example, the input signal and pump are further separated into a set of three or four delay lines 706 and 716, and the pump delay lines further include polarization filters 718. Typically, the polarization filters include a first delay line associated with horizontal polarization filter, second delay line associated with diagonal polarization filter, third delay line associated with circular polarization filter. A fourth delay line may be used with no polarization filter to obtain general data on the signal in a single measurement. Alternatively, the fourth delay line may be associated with opposite circular polarization filter, opposite with respect to that of the third delay line. It should be noted that generally, the use of polarization filters in the delay lines may be used in combination with multimode signal exemplified in FIG. 7B. This may provide combined multimode and multi polarization spectral data of an input signal.

Figure 8A:
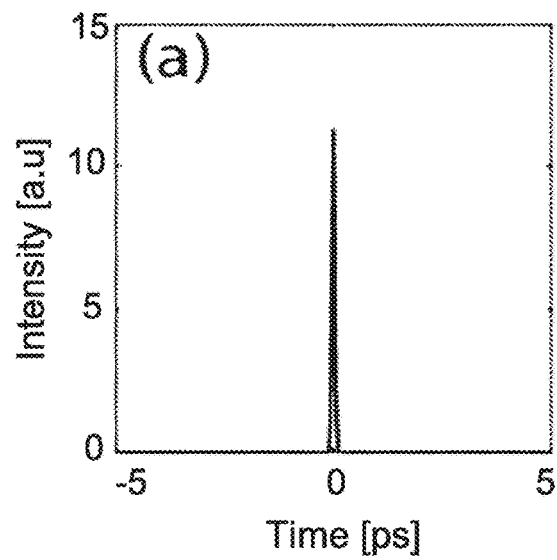
FIGS. 8A to 8D show simulation results of input pump (FIG. 8A), corresponding speckle field (FIG. 8B), the use of speckle field for resolving input double pulse signal (FIG. 8B), and super resolution parameter improvement with respect to LPFG parameters (FIG. 8D).
Figure 8B:
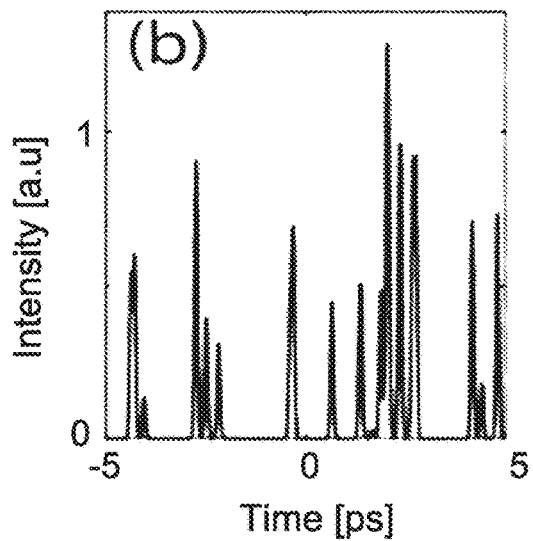
Figure 8C:
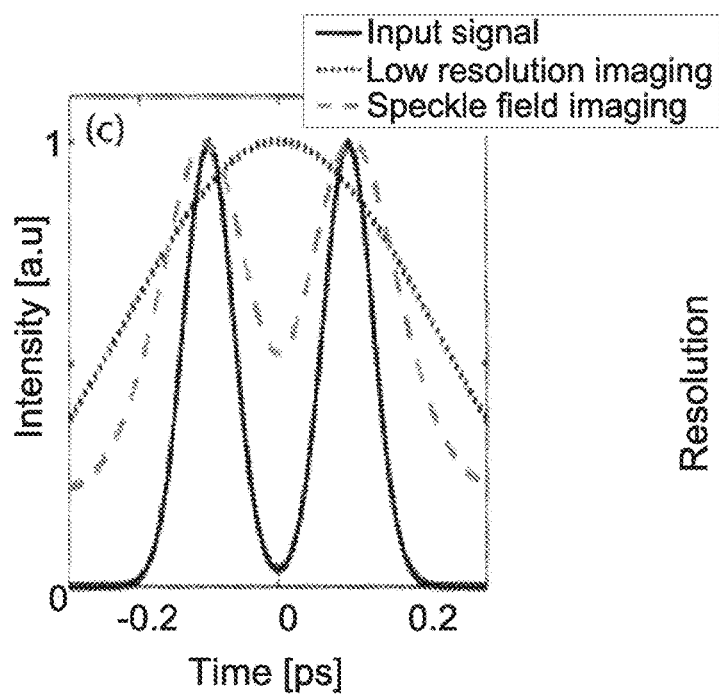
Figure 8D:
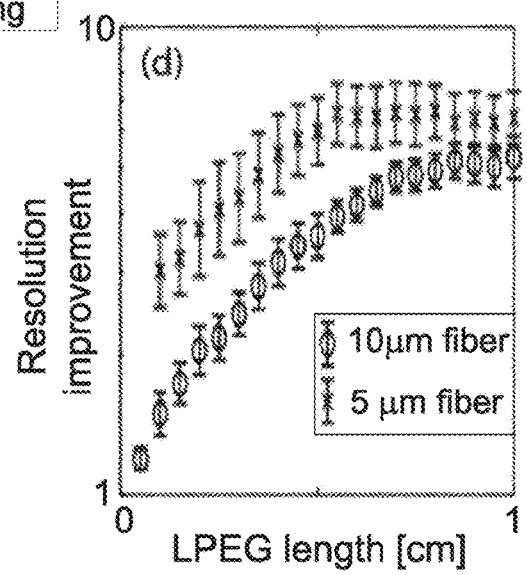

The inventors have performed experiments and simulations for time-lens unit spectrometer associated with speckle generating unit and compared such results to spectral resolution obtained by time-lens spectrometer without the use of temporal speckle field. FIGS. 8A to 8D show simulation of a short pump pulse illustrated in FIG. 8A, speckle field formed by propagation of the short pulse through a random LPFG shown in FIG. 8B. FIG. 8C shows a comparison of measurement of double pulse signal (solid line), time-lens output of the double pulse signal (dotted line) and time-lens output using temporal speckle field of the double pulse signal (dashed line). As shown, the two peaks of the input signal are not resolved through the time lens unit, generally having low-resolution. However, the use of speckle field according to the present technique provides a super-resolution image where the two peaks are easily resolved. This initial simulation data indicates that the temporal speckle field can improve the resolution of time-lens spectrometer systems. It should be noted that this simulation data was repeated using 10000 different random LPFG's and obtained the resolution improvement. FIG. 8D shows relation between the resolution improvement and LPFG length for two different widths of LPFG. These results show that the present technique can improved spectral resolution imaging of an input signal by a factor of 5.

Thus, the present technique provides a spectrometer system, generally configured to operate along optical fibers, and enabling to provide high speed high-resolution spectral data on input pulses. Generally, the input pulses may be ultrashort pulses or longer. The present technique further enables providing spectral data of separate modes in multimode optical signals, as well as obtain super resolution temporal starching and spectral imaging of the input pulses.

The invention claimed is:

1. A system comprising input port providing input to a multimode optical fiber, the input port being configured for receiving input optical signal, a mode temporal separating unit configured to apply selected time delay between signal components of a selected number of different spatial modes in the input optical signal, and an optical spectrometer unit configured for providing high resolution spectroscopic data of the different modes;
wherein the system further comprises a pump signal input module configured for to receive input pomp signal and generate a pulse train having a selected number of pump replications, said optical spectrometer unit utilizes nonlinear interaction between signal and pump waves.

2. The system of claim 1, wherein said optical spectrometer unit comprises a time-lens optical spectrometer.

3. The system of claim 1, wherein said optical spectrometer unit comprises a first signal dispersion fiber and second pump dispersion fiber configured for providing selected chirp level to signal and pump inputs, nonlinear fiber section configured to enable nonlinear interaction between chirped pump and signal waves providing interaction wave, and dispersion fiber configured to apply selected chirp level to the interaction wave, thereby providing output signal indicative of spectral components of the input signal.

4. The system of claim 1, further comprising a temporal speckle generating unit positioned to apply a temporal speckle field onto input optical signal.

5. The system of claim 4, wherein said temporal speckle generating unit comprises random long period fiber grating.

6. The system of claim 5, wherein said random long period fiber grating is positioned under temperature or stress variation.

7. The spectrometer system of claim 1, wherein the signal components relate to different spatial modes, and wherein the optical spectrometer unit is configured for providing high resolution spectroscopic data of the different spatial modes.

8. A spectrometer system comprising:
a signal input port and a pump input port,
respective signal and pump dispersion fibers configured to apply predetermined spectral dispersion on light input associated with signal and pump inputs,
a nonlinear optical fiber section configured to receive dispersed signal and pump waves and enable nonlinear interaction between the signal and pump waves, and an output dispersion fiber configured to receive light resulting from said nonlinear interaction and apply predetermined dispersion to said light, thereby providing output light having mapping between time and spectral components of the input signal;
wherein at least one of the signal input port and pump input port comprises temporal speckle generating unit configured to affect optical pulses passing through to induce temporal speckles within said optical pulses.

9. The spectrometer of claim 8, wherein said temporal speckle generating unit is configured for temporally shifting the speckle pattern between repeating measurements, to thereby enable spectral measurement with improved resolution.

10. The spectrometer of claim 8, wherein said temporal speckle generating unit comprises a random long period fiber grating (RLPFG).

11. The spectrometer system of claim 10, wherein said RLPFG is positioned along said signal input port, said RLPFG is placed under temperature or stress variation to thereby shift said temporal speckles in input optical signals.

12. The spectrometer system of claim 10, wherein said RLPFG is positioned along said signal input port, said signal input port further comprising a wavelength tunable filter configured for selectively shifting wavelength filtering of input signals and a free-space encoding unit configured to provide shifting of temporal speckles with respect to input signal pulse.

13. The spectrometer system of claim 10, wherein said RLPFG is positioned along said pump input port, said pump input port further comprises a delay line configured for selectively temporally shifting speckles with respect to one or more input pulses provided though the signal input port.

14. The spectrometer system of claim 8, wherein said temporal speckle generating unit comprises a pulse shaper unit comprising at least one grating and spatial light modulator, said at least one grating is positioned to receive input pulse and spectrally separate components of said pulse and direct the pulse components toward said spatial light modulator, said spatial light modulator is configured to apply selected (generally pseudo random) spatial pattern on the light components.

15. A system comprising input port providing input to a multimode optical fiber, the input port being configured for receiving input optical signal, a mode temporal separating unit configured to apply selected time delay between signal components of a selected number of different modes in the input optical signal, and an optical spectrometer unit configured for providing high resolution spectroscopic data of the different modes; wherein the system further comprising a temporal speckle generating unit positioned to apply a temporal speckle field onto input optical signal.

16. The system of claim 15, wherein said temporal speckle generating unit comprises random long period fiber grating.

17. The system of claim 16, wherein said random long period fiber grating is positioned under temperature or stress variation.

18. A system comprising input port providing input to a multimode optical fiber, the input port being configured for receiving input optical signal, a mode temporal separating unit configured to apply selected time delay between signal components of a selected number of different modes in the input optical signal, and an optical spectrometer unit configured for providing high resolution spectroscopic data of the different modes;

wherein said optical spectrometer unit comprises a first signal dispersion fiber and second pump dispersion fiber configured for providing selected chirp level to signal and pump inputs, nonlinear fiber section configured to enable nonlinear interaction between chirped pump and signal waves providing interaction wave, and dispersion fiber configured to apply selected chirp level to the interaction wave, thereby providing output signal indicative of spectral components of the input signal.

* * * * *